Mar. 3, 1925. 1,528,314
A. C. WICKMAN
MACHINE FOR MEASURING, GAUGING, OR THE LIKE
Filed July 30, 1921 9 Sheets-Sheet 1
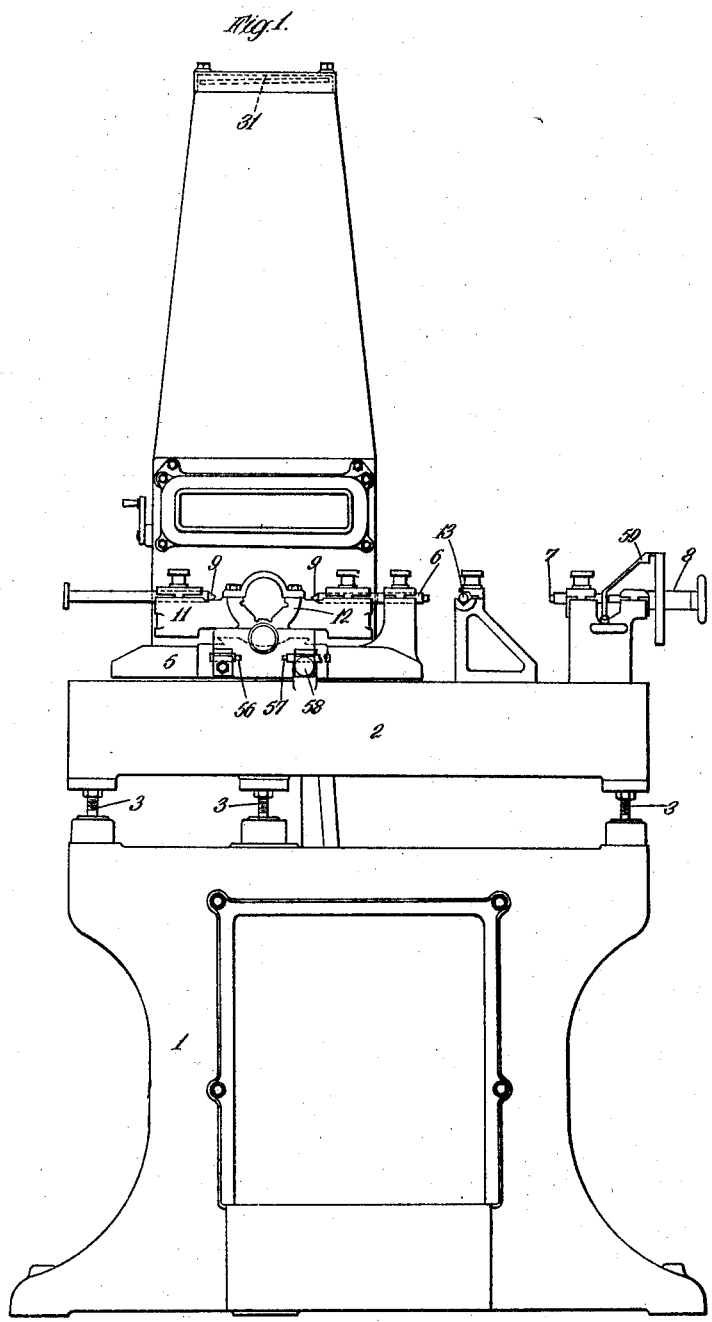

Mar. 3, 1925.  1,528,314
A. C. WICKMAN
MACHINE FOR MEASURING, GAUGING, OR THE LIKE
Filed July 30, 1921    9 Sheets-Sheet 2
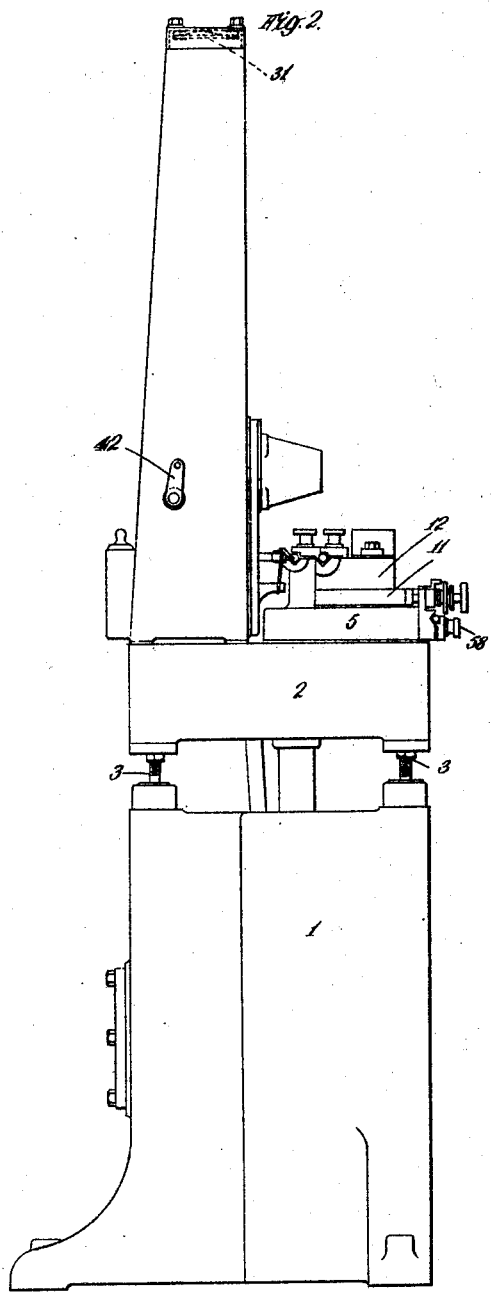

Mar. 3, 1925.
1,528,314
A. C. WICKMAN
MACHINE FOR MEASURING, GAUGING, OR THE LIKE
Filed July 30, 1921  9 Sheets-Sheet 3
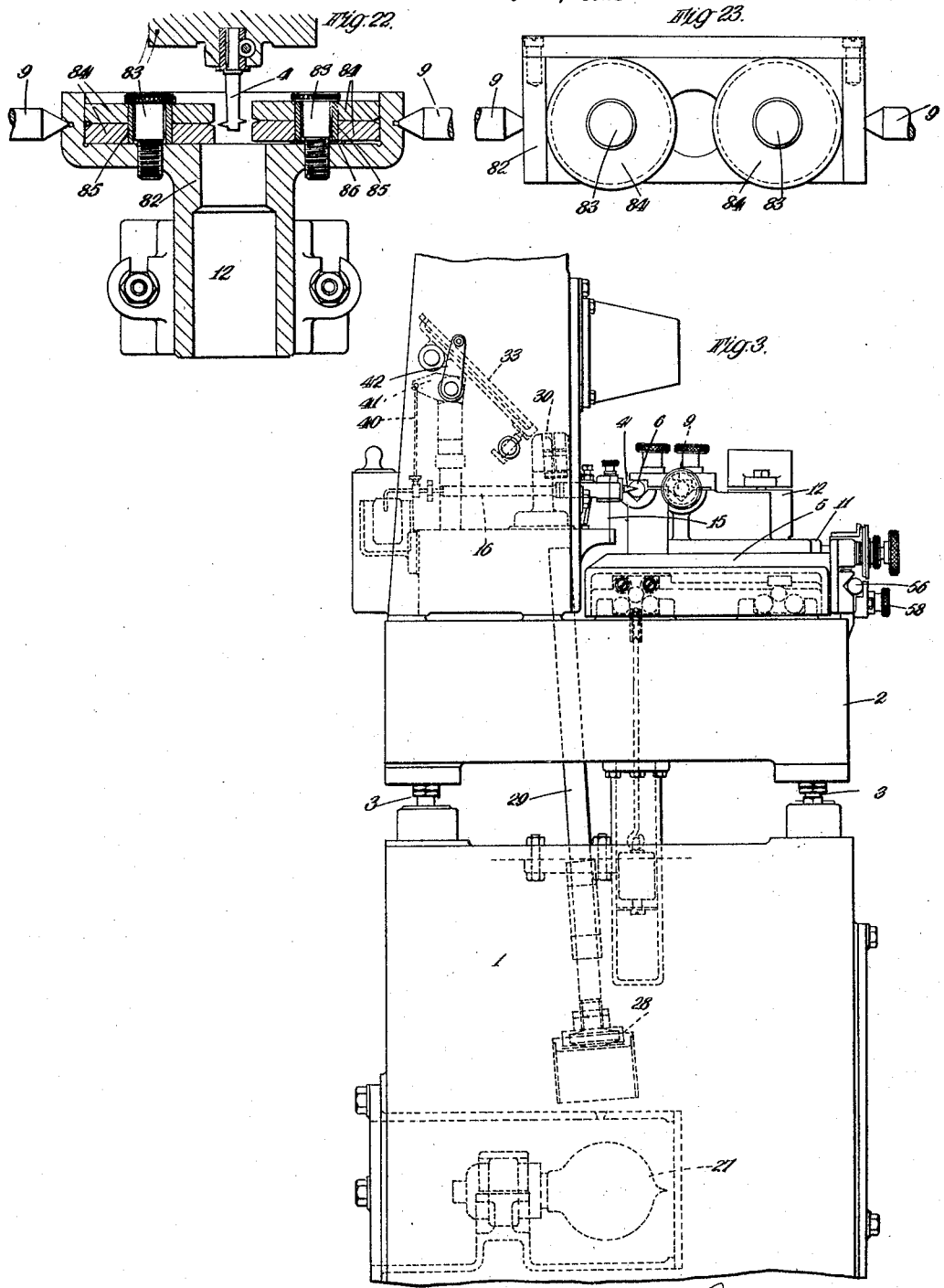

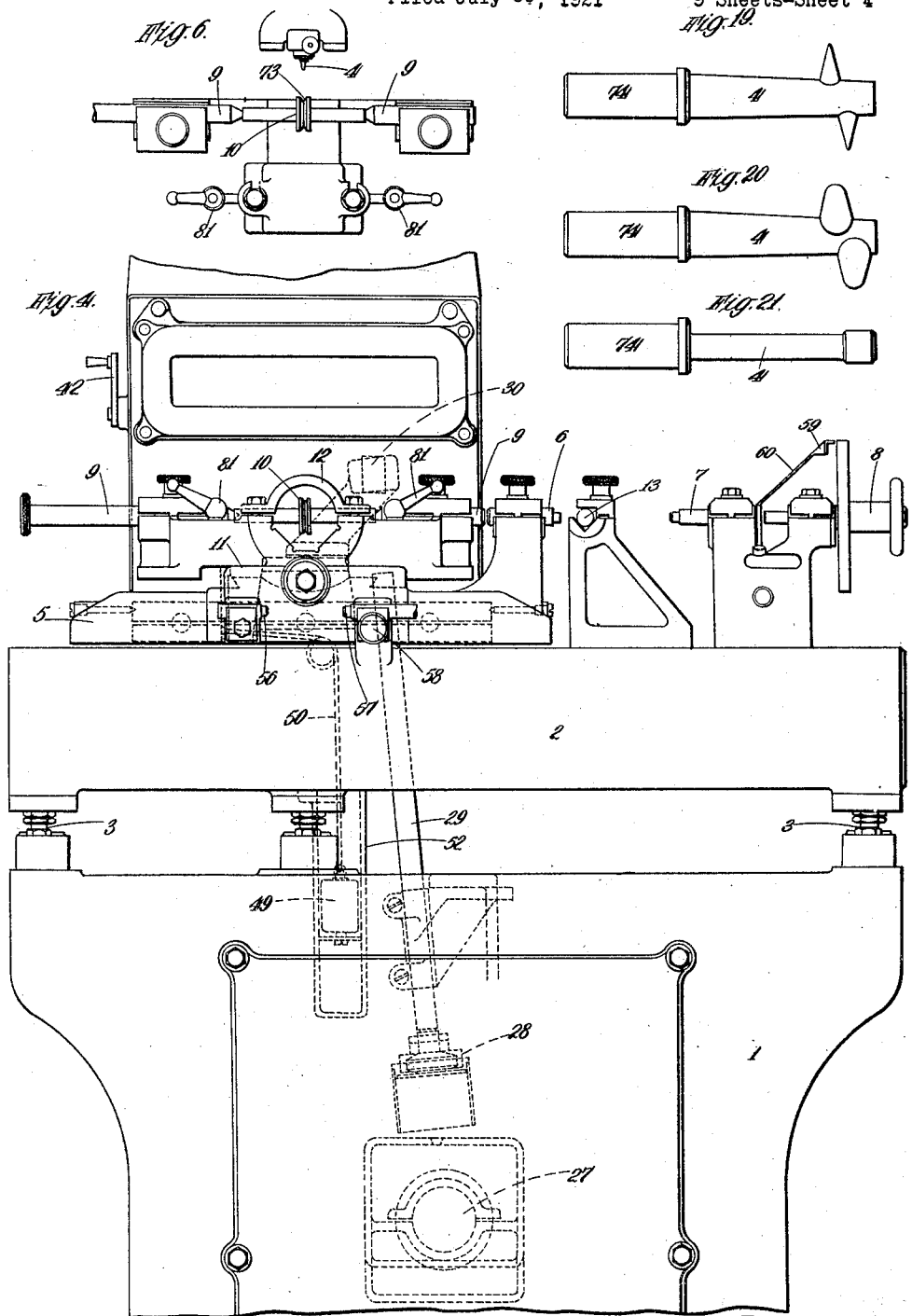

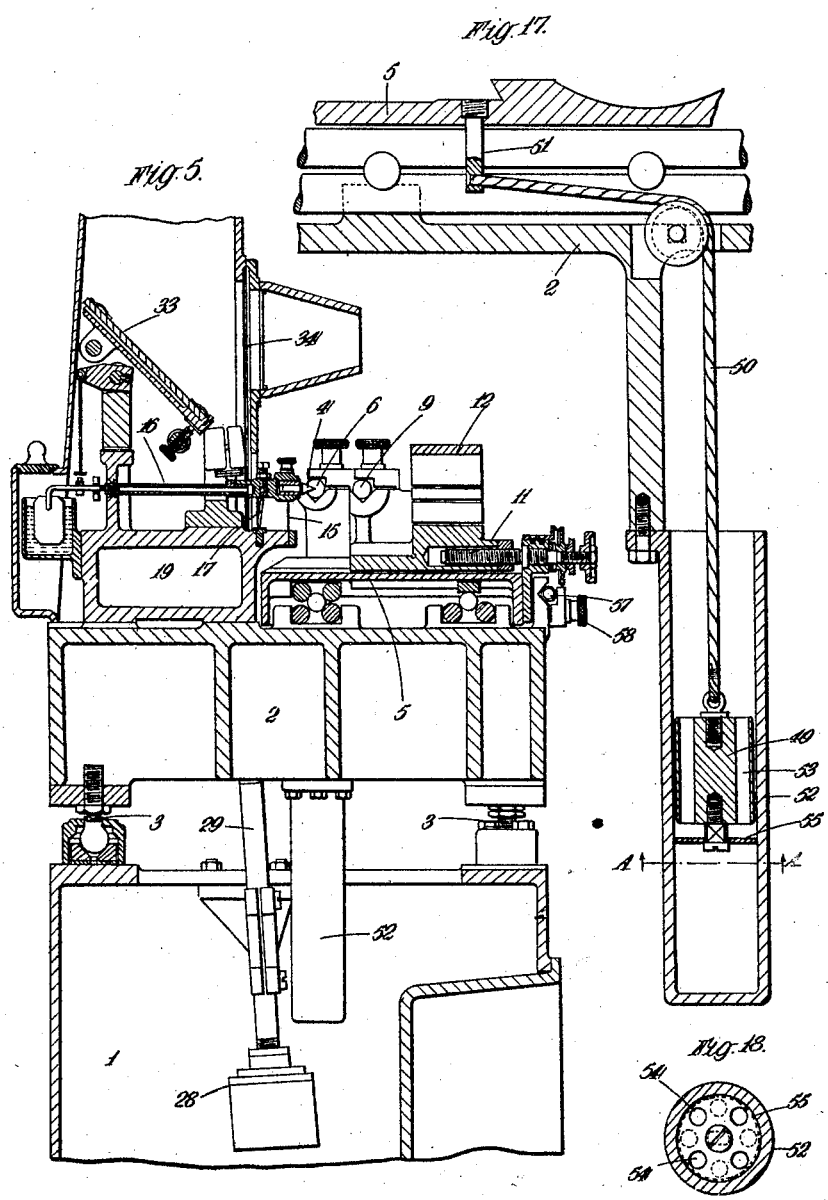

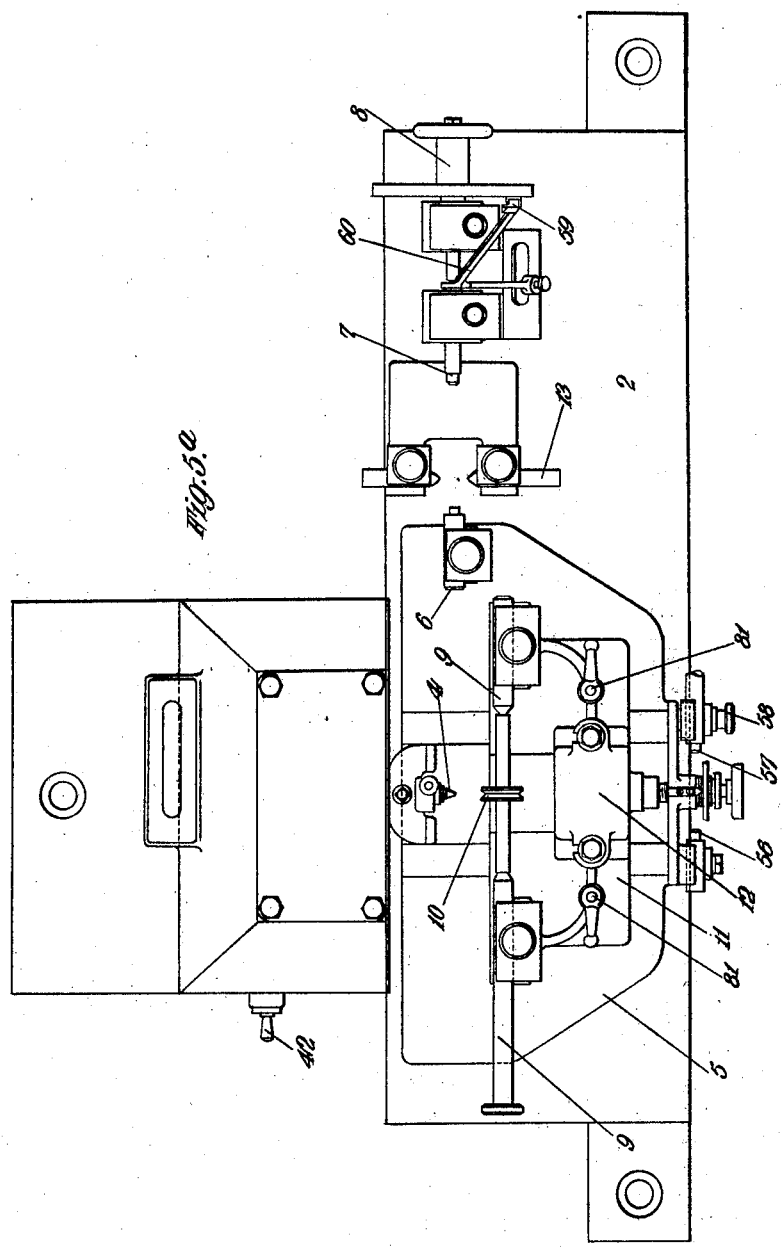

Mar. 3, 1925.
A. C. WICKMAN
1,528,314
MACHINE FOR MEASURING, GAUGING, OR THE LIKE
Filed July 30, 1921      9 Sheets-Sheet 7
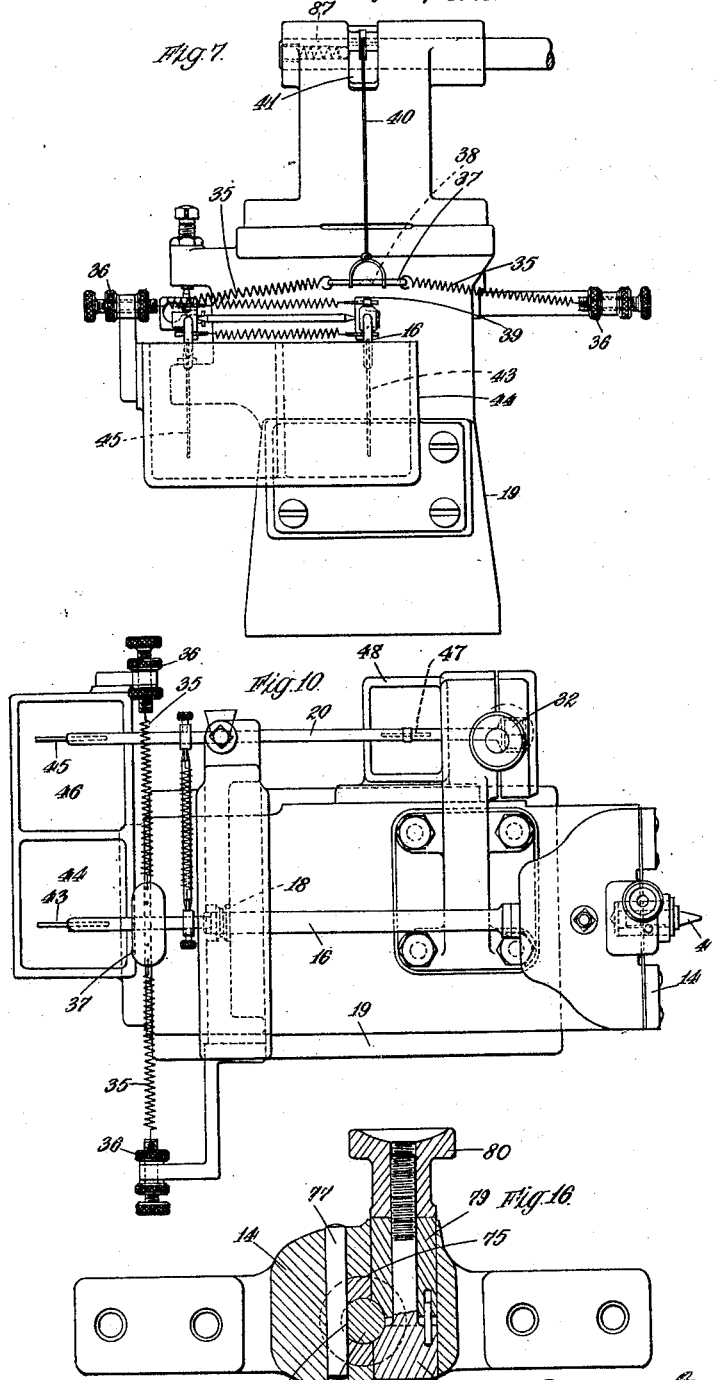

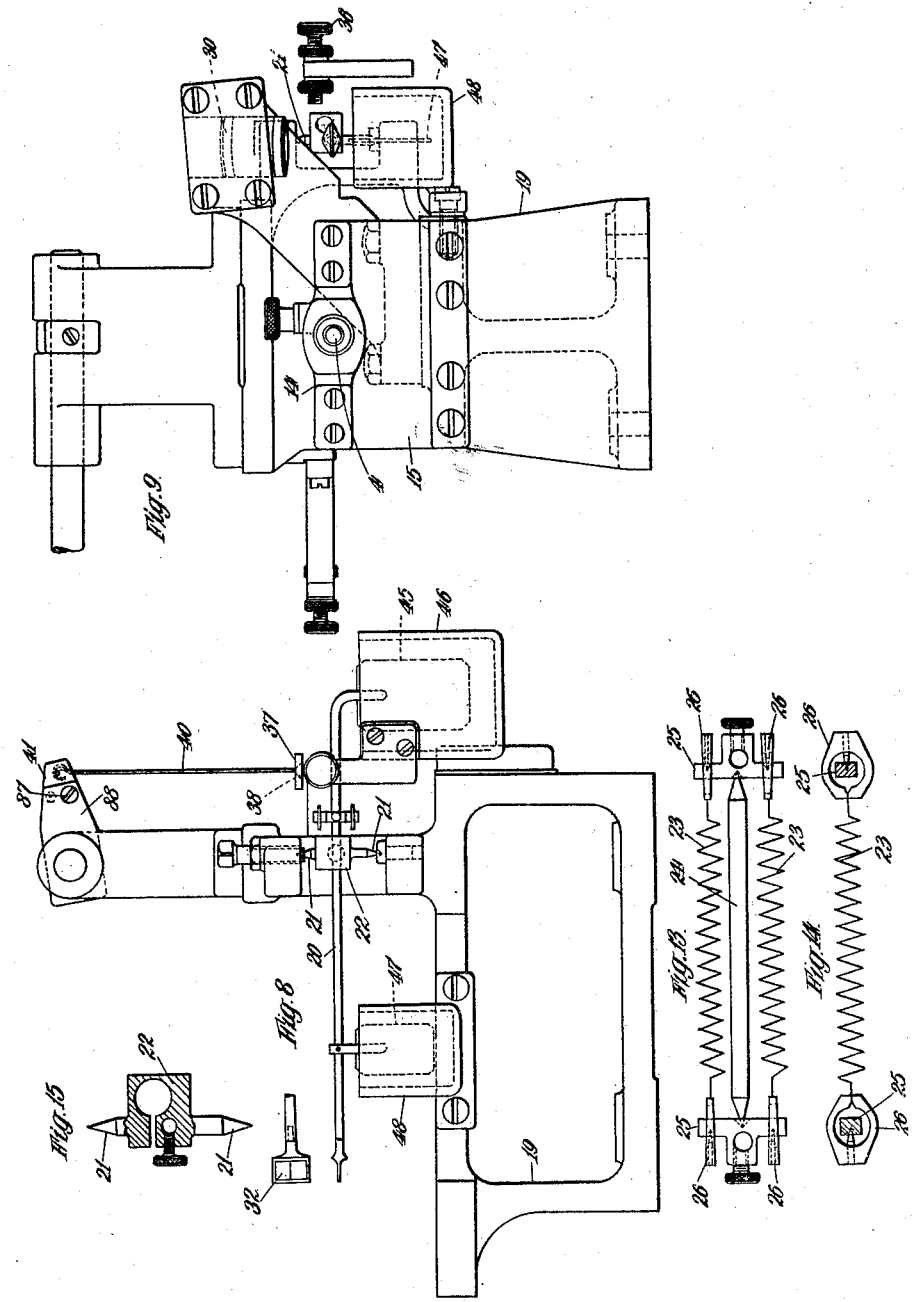

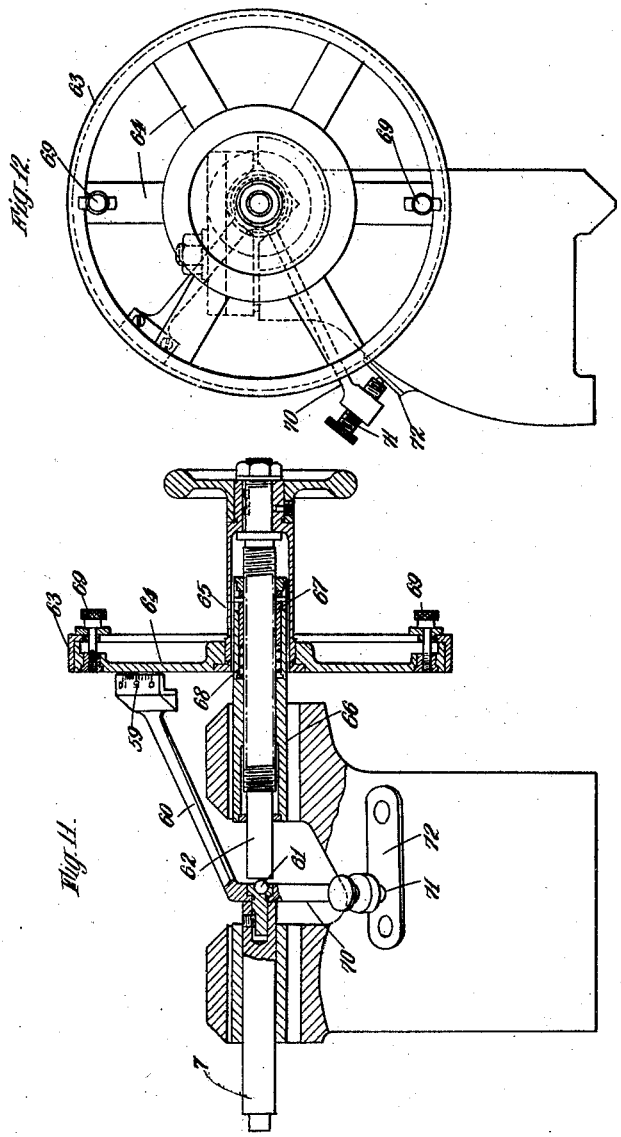

Patented Mar. 3, 1925.

1,528,314

UNITED STATES PATENT OFFICE.

AXEL CHARLES WICKMAN, OF LEAMINGTON, ENGLAND.

MACHINE FOR MEASURING, GAUGING, OR THE LIKE.

Application filed July 30, 1921. Serial No. 488,583.

*To all whom it may concern:*

Be it known that I, AXEL CHARLES WICKMAN, a subject of the King of Great Britain, residing at 17 Avenue Road, Leamington, in the county of Warwick, England, have invented certain new and useful Improvements in or Relating to Machines for Measuring, Gauging, or the like, of which the following is a specification.

The present invention relates in some degree to that kind of machine for measuring, gauging or testing, in which there is employed a member (usually called a stylus but hereinafter referred to as a "contact member") resiliently mounted or controlled and heretofore used for gauging or testing the accuracy of the pitch of a screw thread or the like and measuring any variations thereof. The contact member has been mounted on a resilient steel plate or blade and the machine used by causing a screw thread the pitch of which is to be tested, to pass, by operation of a micrometer, by the contact member which rides over the thread against the resilience of deflection of the said resilient steel plate and when the contact member is in exactly the same position in one convolution of the thread as it was in the preceding convolution, a reading of the micrometer is taken and this reading will show whether the pitch between the two convolutions is what it should be and what it measures and consequently what if any, objectionable variation in its dimension exists. The lateral or angular movement of the contact member is multiplied many times through a system of levers so that it may be ascertained to a very fine degree when its position is such that a reading of the micrometer should be taken. Machines of this kind as heretofore constructed can only be used for gauging, testing, or measuring, pitches of screw threads and the like. The main object of the said invention is to enable diameters, lengths, and other similar lineal dimensions in general to be measured, gauged, or tested, and any variations from what is desired, ascertained and measured to great accuracy and with greater accuracy than is feasible with machines or apparatus at present commonly used for the purpose. The said object is attained according to the said invention by substantially modifying a machine of the aforesaid kind comprising a resiliently controlled stylus or contact member.

According to the said invention the aforesaid contact member co-operates with anvils provided between the micrometer and the carriage or member (hereinafter referred to as the carriage or carriage member) with which the contact member moves in unison when in use, the said anvils being adapted to receive between them a standard piece, and when an outside dimension is in question, the work, one anvil being directly operated by the micrometer and the other operated or controlled by the said carriage which carriage may be operated independently of the micrometer as well as by actuation of the micrometer. When an outside dimension is to be dealt with there is also provided a member (hereinafter referred to as the engaging member) having an annular groove or other recess suitably shaped for the contact member to engage in as heretofore it has been engaged in a screw thread and the engaging member is mounted on the aforesaid carriage preferably between centres. The said invention also comprises several other novel features hereinafter described which facilitate the use of the machine and help to render it very reliable and accurate and some of these features are not limited to machines embodying the main feature of the present invention but may be embodied according to the present invention in other forms of machines.

The engaging member may be conveniently mounted between adjustable centres on a cross slide on the said carriage which is movable horizontally over the bed or table of the machine in line with the micrometer and one of the anvils is secured (preferably adjustably) in place on the carriage. The carriage has connected to it a suspended weight in such manner that the weight tends to cause the carriage to move towards the micrometer and an abutment may be provided on the carriage to co-act with an adjustable abutment on the table for the purpose hereinafter appearing. The dial of the micrometer may be releasably secured relatively to the micrometer handle and screw so that it may be released and moved independently thereof or interchanged with another dial when required. The anvil directly operated by the micrometer may be carried by a stem having a sliding fit in a bearing on a standard on the bed of the machine and the outer end of the stem is preferably provided with a spherical surface against which the end of the micrometer spindle bears.

When with a machine constructed according to the present invention an internal diameter is to be measured, gauged or tested as for instance the effective diameter, major diameter or core diameter of internal screw threads, such as those in ring gauges, a holder for the ring gauge or member or articles is provided on the slide on the carriage so that the ring gauge or article may be moved up to and presented with its face towards the contact member. In this case the engaging member aforesaid is not used. The contact member for use in these tests is a double one, that is, the stem of the contact member has two diametrically opposite or lateral projections each similar to the other in shape and size and so shaped that either may properly engage in or against the thread or surface to be dealt with somewhat in the same manner as the contact member in the pitch measuring machines at present in use.

The vernier or indicating needle or pointer of the micrometer is preferably on an arm secured on the stem of the anvil operated by the micrometer and having a lower lever extension making contact with a surface more or less inclined or varied for compensating any inaccuracy in the micrometer screw.

In order to compensate for any wear of the micrometer screw threads a spring may be arranged between a shoulder in the screwed socket or nut of the micrometer and a screwed bush around and screwed on the micrometer stem or spindle which bush is prevented from rotation therewith but is free to move axially relatively to the socket or nut of the micrometer subject to its screw thread engagement. The spring therefore tends to press the spindle outwardly so that any wear of the screw threads of the spindle and socket or nut is taken up in an axial direction away from the anvil, and the screwed nut and screwed bush keep the wear of the micrometer screw constant. The dial of the micrometer may be mounted on a socket or bush surrounding the said socket or nut of the micrometer with a little clearance and secured to the spindle near the handwheel thereon, with the result that the weight of the dial is carried, through the medium of the said surrounding socket or bush and the spindle, by the aforesaid screwed bush, (which has a working fit in an extension of the socket or nut of the micrometer) and not by the screwed part of the said socket or nut.

In machines in which a resiliently mounted contact member is employed as aforesaid the indicating action thereof is usually multiplied many times to the required degree solely by a system of multiplying levers whereby the desired accuracy is impaired but preferably the indication movement of the contact member is multiplied by a lever or levers (say for instance two) as aforesaid to or within a degree to which they act quite accurately and the multiplication is carried on and completed to the desired extent by means of a beam of light caused to pass through a condensing lens and then by the free end of the last lever and through a fixed projecting lens arranged a short distance from the said lever end so that a shadow may be produced such a distance away that movement of the shadow indicates the movement of the aforesaid member to the desired multiplied degree.

The multiplying levers aforesaid are usually coupled up by an intermediate movement transmitting member or members having needle point or similar bearings with or on the levers and the said coupling member or members is or are kept in place by a spring bearing against the last lever of the system so arranged that movement of that lever in one direction is against the resilience of the spring and return to normal position is caused by the said spring. The resilience of the spring therefore keeps the coupling member or members in place but the present inventor has discovered that this arrangement vitiates the accuracy of the action of the system of levers. According to the present invention the aforesaid bearings of the coupling member are retained in place on the levers by springs arranged in direct or immediate association with the bearings in distinction to a spring at or near the end of the lever system. The arrangement is such that the only effect of the springs is to keep the coupling member in proper position, that is, the spring action is balanced.

In order to steady the movement of the multiplying levers it is preferred to provide them with vanes working in receptacles containing a liquid or liquids suitably viscous and the degree of viscosity of the liquid in each receptacle may vary inversely to the degree of movement of the particular lever or vane thereof.

In dealing with internal diameters the contact member when in use should always have the same zero or negative indicated position in about the middle of the screen on which the shadow appears but the usual resilient mounting of the contact member is not sufficient to ensure this having regard for the great multiplication of the movement of the contact member and the nature of the usual resilient mounting. According to the present invention therefore additional centralizing means are provided; these means preferably consist of helical tension springs co-acting with the rear part of the lever of the contact member and laterally controlling it. These springs are accurately adjusted initially or from time to time to correct any tendency in the usual resilient mounting to take any set out of its original plane.

In order that the said invention may be clearly understood and readily practised it is hereinafter particularly described with reference to the accompanying drawings which illustrate by way of example the preferred embodiments thereof.

In the said drawings:—

Figure 1 is a front view of the complete machine and Figure 2 a side view thereof. Figures 3 and 4 are respectively a side view and front view, in greater detail, of the more important part of the machine and Figure 5 is a vertical section of the greater portion of the part of the machine shown in Figures 3 and 4. Figure 5A is a plan view with the hood or case in front of the screen 34 removed. Figure 6 is a somewhat diagrammatic plan view of the contact member and certain parts adjacent thereto. Figures 7, 8, 9, and 10 are respectively a rear view, a side view, a front view and a plan of the parts carrying the contact member, the multiplying levers and parts in close association therewith. Figures 11 and 12 are detail views of the micrometer, Figure 11 being a sectional side elevation and Figure 12 an end view. Figures 13 and 14 are detail views of the coupling devices between the multiplying levers. Figure 15 is a detail view of the pivot for the second multiplying lever. Figure 16 is a detail view, being mainly a vertical section, showing the means for securing the contact member in position. Figure 17 is a detail view in vertical section illustrating the arrangement of weight co-acting with the movable carriage of the machine and Figure 18 shows a section thereof taken on the line A, A in Figure 17 looking upward. Figures 19, 20 and 21 are detail views showing different forms of contact members and Figures 22 and 23 are detail views illustrating a device for calibrating contact members for use in gauging the effective diameter of an internal screw thread, Figure 22 being a horizontal section and Figure 23 a face view.

The various figures of the drawings are not on the same scale, Figures 1 and 2 being on the smallest scale, Figures 3, 4, 5, 5A, and 6 on a somewhat larger scale than Figures 1 and 2; Figures 7, 8, 9, and 10 on a still larger scale and the remaining figures, showing details, being drawn on yet larger scales.

In the following description the parts of the said drawings are referred to by the numerals thereon, the same numerals of reference indicating the same or like parts in all the figures.

1 is the fixed base part of the machine upon which is supported the upper part or table 2 of the machine in or on which are mounted all the more vital and functional parts the support being through the medium of adjustable screwed members 3 on the table 2 having spherical bottom parts resting on appropriately shaped seats on the base 1 (see Figure 5), these adjustment devices being for levelling purposes. 4 is the displaceable contact member and 5 is a carriage slidably disposed in front of the contact member the bearings between the said carriage and the table of the machine being of the kind described and claimed in the specification of British Patent No. 133416 dated 4th October 1918, that is to say, the bearings comprise bearing surfaces formed of cylinders or cylindrical members with their axes parallel and in the particular form of bearing shown balls or spheres are disposed between or bearing on, the cylindrical bearing surfaces (see Figure 5). 6 and 7 are the anvils operatively positioned between the micrometer device and the carriage 5 the anvil 6 being mounted on the carriage and the anvil 7 being that which is directly operated by the micrometer device which is shown at 8. Both the anvils 6, 7 are adjustable axially as shown. 9, 9 are adjustable centres mounted on the carriage 5 between which may be mounted or held in position the aforesaid member with which the contact member engages, that is the engaging member, and this engaging member is shown in such position in Figure 6 where it is marked 10. The centres 9, 9 are carried by the cross slide 11 on the carriage 5 and this slide also carries a clamping or holding device 12 for the purpose hereinafter described. The cross slide may be moved and adjusted toward or from the contact member by the screw-devices shown and clamped in adjusted position by the devices at 81, 81. At 13 are cross centres arranged in a plane at right angles to the axes of the anvils 6, 7, for the purpose of helping to support any member placed between the said anvils when such aid is desirable. The contact member 4 is mounted in a head 14 secured to the upper part of the usual flat steel resilient member or plate spring 15 which is rigidly secured at its lower part to the member 19 hereinafter referred to. 16 is the lever extending rearwardly from the head 14 and constituting the first of the multiplying members. This lever 16 is supported by a strut 17 as usual having pin point bearings above and below, and near its rear end passes freely through an aperture 18 (see Fig. 10) in a part carried by the member 19. The lever of the contact member 16 is flexibly coupled up with the second multiplying lever 20 near their rear and the lever 20 is supported to the front of such coupling on pin point bearings 21, 21 best shown in Figure 8, the pin points being on a member 22 secured by a set screw on the lever the body of which member is made of jaw formation so as to be slightly resilient in a vertical direction as will be readily understood by examining Figure 15. The levers 16, 20 are connected together as best seen in Figures 13 and 14 by coiled tension springs 23, 23 acting through a strut 24 having pin point bearings on the inner sides of members 25 secured on the levers and yokes 26 having pin point bearings on the said members 25 on their outer sides. The spring action by which the coupling of the levers 16, 20 is effected is therefore balanced, that is, lateral pivotal movement of the levers may take place without the aid of or having to do work on springs. Generally the mechanical action of a set of multiplying levers to multiply the movement of the contact member is not to be relied on beyond two levers and therefore the set of such levers in the machine illustrated consists of but the two levers 16, 20 and the multiplication is carried on and completed to the proper extent by means of a beam of light. The light is supplied by an electric lamp 27 (see Figures 3 and 4) a beam from which passes through a condensing lens 28 upwardly through the tube 29 to the lever 20 and through a projecting lens 30 (see Figure 9) to a mirror 31 at the top of the machine (see Figures 1 and 2). The fore end of the lever 20 carries a piece of transparent material 32 (see Figures 8 and 10) on which there is engraved a hair line so that the shadow of this hair line is thrown on the mirror 31 and from that mirror the shadow is reflected on to the mirror 33 below from which it is thrown on the semi-transparent screen 34 at the front of the machine for observation by the operator.

The multiplying levers, contact member and parts functioning therewith are mounted on and in the member 19 secured on the table of the machine beneath the mirror 33.

For dealing with internal diameters the zero position of the shadow on the screen 34 should always be in about the middle thereof but the multiplying devices provided are so great in effect that it is found that the resilient blade 15 cannot be solely relied on to cause the contact member to retain its exact original zero or normal position owing presumably to a tendency to take an extremely slight set out of the normal or a slight reluctance to assume that position. In order to correct this the resilient movement of the contact member is therefore further or additionally controlled and the contact member centralized by coiled tension springs 35 to the rear and designed to act laterally when required on the rear part of the lever 16. These springs as best shown in Figures 7 and 10, are secured at their outer ends to adjustable devices 36 by which their tension may be accurately adjusted initially or from time to time as may be required. At their inner ends the said springs are connected to a plate 37 having a coned aperture 38 in it the part of the said aperture of smallest diameter having a fine working fit over a pin 39 carried by the lever 16. The member 37 is carried by a wire link 40 secured to a lever 41 above on a shaft carrying a crank handle 42 on the outside of the machine. By turning the handle 42 through an appropriate angle the member 37 may be allowed to descend to engage the pin 39 or lifted up to disengage the said pin. When the machine is not in use for internal diameters the member 37 is kept raised but when the machine is to be used for internal diameters the member 37 is lowered to ensure that the zero position of the lever 16 is such that the position of the shadow on the screen is about in the middle thereof. The lever 41 is retained in either position by a spring and ball latch 87 in an arm 88.

In order to steady the movement of the lever 16 it is provided at its rearward extremity with a vane 43 immersed or partially immersed in a somewhat viscous liquid in a receptacle 44. The lever 20 is similarly provided at its rear end with a vane 45 in liquid in a receptacle 46 and has another vane 47 near its front end working in liquid in a receptacle 48. The viscous liquid used is preferably non-oxidizing or lubricating oil or glycerine. The liquid in all the receptacles 44, 46, 48 may in most cases have the same degree of viscosity but where great refinement in the steadying action is desired the liquids in the three receptacles may vary in their respective viscosity according to the relative degree of movement of the particular vane working in the liquid. Thus the viscosity of the liquid in the receptacle 44 may be greater than that in the receptacle 46 and that in the receptacle 46 greater than that in the receptacle 48.

The carriage 5 and its anvil 6 are caused to move or have tendency to move towards the anvil 7 by means of a weight 49 as shown in Figures 17 and 18. This weight is connected by a cord or the like 50 with a pin 51 on the underside of the carriage 5 and is combined with a dash-pot device in order that the action of the weight may never take place too suddenly. The dash-pot device is constituted by a receptacle 52, in which the weight 49 works, containing somewhat viscous liquid such as lubricating oil or glycerine and by forming the weight with longitudinal passages 53 staggered in relation to apertures 54 in a plate 55 a little distance below and carried by the weight 49.

A stop device 56, 57 is provided operatively between the carriage 5 and table 2 in order to limit the movement of the carriage 5 towards the anvil 7. This stop device consists of a stop 56 on the carriage co-acting with a stop 57 on the table. The stop 57 is of rod form (part being broken away in the drawings) and may be adjusted longitudinally as desired from time to time and set in adjusted position by the clamp 58.

The vernier 59 of the micrometer is on an arm 60 carried on the rear part of the stem of the anvil 7 as best seen in Figure 11 and may turn thereon. The vernier therefore always follows the axial movement of the micrometer screw and dial so that the relationship of the vernier or indicating needle or pointer and the micrometer dial in an axial direction or laterally does not vary. A spherical bearing 61 is provided between the end of the micrometer screw spindle 62 and the stem of the anvil 7. The micrometer dial 63 and the arms 64 carrying it are mounted on a socket or bush 65 surrounding with clearance the screwed socket or nut 66 of the micrometer the socket 65 being secured at its outer end to the outer end of the micrometer spindle 62. Surrounding the screw spindle 62 is an internally screwed bush or nut 67 engaged with the screw thread of the micrometer screw on the outer side of the micrometer nut 66 and having a good working fit in an outward extension of the socket or nut 66. This bush 67 is prevented from rotation but is free to move axially so far as its engagement with the micrometer screw 63 and the engagement of the latter with its nut 66 will permit and between an internal shoulder in the nut 66 and the inner end of the bush 67 a coiled compression spring 68 is arranged. This spring therefore tends to press the screw spindle 62 outwardly and thus any wear in the screw thread engagement between the spindle and its nut 66 is taken up in an axial direction away from the anvil and the two nuts 66, 67 keep the wear of the micrometer screw constant. The provision of the socket or bush 65 to carry the micrometer dial and arms and the arrangement of the bush 67 with a working fit within an extension of the micrometer nut 66 relieves the screwed part of the said nut 66 from the weight of the micrometer dial and arms carrying it.

The micrometer dial 63 is secured on the arms 64 by manipulable screw clamping pins 69 so that the dial may be turned round or angularly adjusted on the arms and also be readily interchangeable with another dial differently calibrated.

The vernier carrying arm 60 has an extension 70 carrying a screw 71 which bears against the plate 72. This plate is carefully shaped on its outer face so as to compensate for any inaccuracy found to exist in the micrometer screw at any part or parts thereof the said compensation being effective by reason of the bearing of the screw 71 on the plate 72 controlling the angular position of the vernier 59.

The engaging member 10 for the contact member has an annular V groove 73 (see Figure 6) with which the point of the contact member engages. This engaging member is used when outside dimensions are dealt with and for such purpose the contact member can always have the one tapered or conical form proper to engage with the groove 73. For inside dimensions however different shaped contact members must be employed according to the nature of the work and therefore as it is usually very desirable that the machine should be such as to be capable of dealing with both outside and inside dimensions provision is preferably made as illustrated for using interchangeable contact members (see Figures 5, 6, 16, 19, 20, 21 and 22). Each contact member has a short stem 74 which has a fine working fit in a steel bush 75 having a press fit in the head 14. A flat 76 is provided on the stem 74 as shown in Figures 16 and 22 and a cotter 77, engaged in a hole in the head 14 and a notch in the bush 75, abuts laterally against the flat 76 and so prevents rotation of the contact member. The stem 74 is tightly gripped between two clamping blocks 78, 79 (see Figure 16) the block 78 having a screwed stem with which a finger nut 80 engages whereby the two blocks 78, 79 may be forced together and releasably clamp the stem 74 between them.

It is to be understood that in the accompanying drawings the machine is illustrated for the sake of clearness with its anvils apart although no work is shown in the machine and the stop device 56, 57 is not shown as being in action. These positions of those parts could not jointly be assumed in actual practice in consequence of the action of the weight 49 on the carriage 5.

When it is desired to measure or gauge with the machine an outside lineal dimension such as the length of a small rod the carriage 5 is pushed back by hand against the action of the weight 49 to separate the anvils 6, 7 and between the said anvils is placed a standard piece having the required dimension of the work to be gauged or a known dimension approximating thereto. The engaging member 10 is then arranged between its adjustable centres 9, 9 and advanced by means of the slide 11 in such manner that the contact member fairly engages in the groove 73 in the engaging member. The micrometer at 8 is then operated to move the anvils 6, 7, standard piece between them, and carriage 5 until by means of the multiplying indicating devices indication is afforded by observation of the movements of the shadow on the screen 34 that the contact member 4 is exactly in its neutral position laterally considered in the groove 73. The dial 63 of the micrometer is then released by relaxing the screws 69 and turned round to zero and again secured by the screws 69 in that position. The adjustable abutment 57 on the table 2 is then set up to the abutment 56 on the carriage 5 except for say a space of a width about the thickness of tissue paper. The micrometer is then with the anvil 7 retired a little and the standard piece removed from between the anvils and the piece to be gauged or measured inserted between the anvils in substitution for it. If when the micrometer is again operated to bring its dial to zero the position of the shadow on the screen is exactly in the same position as immediately before the standard piece was removed then the piece being gauged has exactly the same dimension as the standard piece but if the micrometer dial is not in that position then the difference between its position and zero will indicate the amount by which the dimension of the piece being tested varies from the standard. It will be appreciated that the operation of gauging testing or measuring is effected without any variable pressure between the anvils due to operation of the micrometer as in consequence of the weight control of the carriage 5 the pressure between the anvils is always constant. Great accuracy in the test or measurement is therefore assured.

The object in not bringing the stops 56, 57 quite up to each other before removing the standard piece is to provide that the carriage 5 may be free to move not only to accommodate the work in case it may have a larger dimension than the standard but also free to move slightly in case the dimension to be gauged is a little less, without readjusting the stop 57. The operator is therefore assured that the shadow on the screen is free to move to each side of zero position.

In using the machine for gauging or measuring dimensions of an internal screw thread such as a ring gauge different shaped contact members must be employed according to the dimension to be gauged and the machine is used somewhat differently. the engaging member 10 not being employed. For dealing with the major diameter or effective diameter of the thread the contact member must be a double one, that is, it has two opposite lateral projections similar to each other and each properly shaped to engage the work. Figure 19 illustrates a contact member for dealing with the major diameter and Figure 20 a contact member for dealing with the effective diameter. For the core diameter the contact member has truly parallel sides at its extremity preferably formed by shaping it as a true cylinder as shown in Figure 21. The acting lateral parts of the contact members (Figures 19 and 20) engage the thread on each side of the work somewhat in the same manner as the contact member in the pitch measuring machines already known and the two points of the contact member are spaced apart along the axis of the stem of the contact member exactly half the pitch of the thread to be gauged. The work is secured in the holder 12 on the slide 11 or other holder suited to the work. The holder shown is for an article such as a ring gauge which is screwed onto the screwed end of a plug with a stem and the stem accurately fits horizontally in the holder 12 where it is clamped so that the ring gauge faces the contact member. The member 37 is lowered to engage the lever 16 of the contact member to obtain the centralizing control of the springs 35 over the said lever. After causing the anvils 6, 7 to be in contact with each other the point of the contact member on the one side is truly engaged in the screw thread at that side and the micrometer adjusted until the shadow on the screen shows that the contact member is deflected laterally slightly from zero and the micrometer dial is released and set to zero. A standard piece is then taken of a lineal dimension equal (or approximating to a known extent) to the correct diameter to be gauged less the greatest distance between the effective parts of the two points of the contact member in a plane perpendicular to the axis of the stem 74 but plus K, where K equals the total deflection of the contact member from one side of zero to the other side of zero. This standard piece is inserted between the anvils 6, 7 thus causing the carriage 5 with the work to be correspondingly displaced from its former position. The insertion of the standard piece thus causes the one point of the contact member to leave the thread on one side and the other point of the contact member to enter the thread on the other side. If the deflection of the contact member is indicated by the shadow as being precisely to the same extent as provided for in the standard piece then the diameter is proved to be equal to the dimension between the anvils together with the distance between the effective parts of the two points of the contact member but minus K but if the micrometer has to be operated to a position other than zero to bring the second point of the contact member into such a position of engagement with the thread as will bring about the proper deflection of the contact member then the micrometer dial will indicate to what extent the diameter being gauged differs from the standard dimension plus the difference between the effective parts of the two points of the contact member and minus K. When the two points of the contact member are offset from each other a distance equal to half the pitch of the thread the leverage on each side is not quite the same and consequently K will not extend equally on each side of zero. The different extent of K on each side due to this difference of leverage can easily be determined by measuring a plain ring gauge the accurate diameter of which is known and then the difference may be allowed for. Instead of the two points of the contact member being offset as aforesaid along the stem of the contact member they may be diametrically opposite in which case after the standard piece has been inserted between the anvils the work must be moved axially by means of the slide 11 to an extent equal to half the pitch of the screw thread or the work must be turned through half a rotation. It is important in work of this character that the centre of the circle the internal diameter of which is to be gauged be in the same horizontal plane as the axis of the contact member and in order to avoid change of the holder 12 for dealing with different diameters of ring gauges and the like the stems of the plugs on which they are mounted are all of exactly the same diameter and such as to lie in the holder 12 with their axes in the same horizontal plane with the axis of the contact member. In cases where the screwed end of the plug on which the ring gauge or the like is screwed is flush with the face of the ring gauge or projects into the gauge beyond the part of which it is desired to gauge the diameter the screw threaded head of the plug has a diametrical slot or slots across it to admit of access of the contact member to the screw thread and movement of the work across the contact member to enable the other point of the contact member to engage the thread on the other side.

The gauging of the core diameter of an internal screw thread by means of the contact member shown in Figure 21 will be readily understood from the foregoing description as also the gauging or measuring of plain holes or other internal dimensions for which purpose a contact member having diametrically opposite lateral points is preferably used.

The anvils may be shaped according to the work dealt with but where an external diameter is to be dealt with as between the bottoms of sharply angled recesses such as the root diameter of an external screw thread it is preferred to deal with it after the manner of an internal dimension, the work however having to be retired on the slide 11 from the contact member when the contact member has acted on the one side and is to be caused to bear on the other side.

In forming a contact member for dealing with effective diameter of screw threads the points of the contact member must be accurately shaped so that they will engage the thread at the proper points between two convolutions of the thread, or calibrated. This gives no great difficulty in the case of external threads as the correct diameter of the engaging part having regard to the pitch may be readily ascertained by applying cylindrical wire or pins of known diameters laterally in a thread space. This however cannot be done in the case of an internal thread and on the other hand as the present invention enables internal screw threads to be tested and thus made to greater accuracy than heretofore it is hardly feasible to calibrate a contact member for use with the effective diameters of internal screw threads, by test with an internal thread such as those in ring gauges heretofore made. The devices illustrated in Figures 22 and 23 are therefore provided for the purpose and are used in the machine. The member 82 is designed to be secured in the holder 12 and held between the centres 9, 9 and is provided with two adjustable screw pins 83 each for clamping together two discs 84 the meeting edges of which are so shaped as together to represent in section the true form of a thread section. This section is calibrated or its width at different depths ascertained by the use in the known manner of the cylindrical wire or pins of different known diameters as aforesaid. A bush 85 accurately fitting the bores of each pair of discs is provided and a clearance is provided between the said bush and the pin 83 so as to allow of adjustment of each pair of discs. The equivalent of two external thread grooves of correct known form and width at different depths are thus provided and in order to deal with a contact member having offset points as aforesaid the groove provided by one pair of the discs is spaced from the other groove in the direction of their axes a distance equal to half the pitch of the thread to be gauged. This is conveniently done by a packing washer 86 beneath one pair of discs, of thickness equal to the said half pitch the thickness of all the discs 84 being equal the one to the other. The two pairs of discs are spaced apart a known distance and the form and dimensions of the grooves being accurate and known there is in effect provided a correct known section of a thread groove on each side and by use of the machine any inaccuracy in form of the points of the contact member may be determined in degree or calibrated.

By forming the model of thread section by two discs such as 84 the thread groove may be more readily formed with great accuracy than if it were cut in one integral member.

The present invention does not prevent the use of the machine for gauging the pitch of external screw threads as heretofore, provided the anvils 6, 7 or one of them be sufficiently long to be capable of adjustment to abut one against the other in a good working position of the carriage or provided the support for the anvil 7 and the micrometer can be adjusted on the bed of the machine sufficiently near to the anvil 6.

In machines according to the present invention the accuracy of the micrometer screw threads may be readily tested by placing between the anvils a succession of standard pieces having dimensions proportional to the pitch of the screw thread and this testing is effected without disturbing the lateral relationship between the micrometer dial and its vernier or indicating pointer. The test may thus be readily and accurately carried out and the consequent design of the compensating device 72 much facilitated.

What I claim and desire to secure by Letters Patent of the United States is:—

1. A measuring, gauging, or testing machine, having in combination a contact member, a resilient support for said contact member, means to indicate in a multiplied manner variation in location of said contact member, a micrometer device, and devices enabling the dimensions of the work to control the location of the said contact member, the said devices comprising a movable carriage member, means whereby the said contact member when it is in use moves in unison with the said carriage member, co-operating anvils to accommodate between them the work or standard pieces, means whereby one of the said anvils is operatively connected with the said carriage member, and means whereby the other anvil is operatively connected with the said micrometer device.

2. A measuring, gauging, or testing machine, having in combination a contact member, a support for said contact member permitting movement thereof, a movable carriage member, a member on said carriage member with which the said contact member may engage to enable the position of the said carriage member to control the location of the said contact member when in use, a micrometer device, co-operating anvils for accommodating the work between them, means whereby one of the said anvils is operatively connected with the said carriage member, means whereby the other anvil is operatively connected with said micrometer device, and means to indicate in a multiplied manner variation in location of said contact member.

3. A measuring, gauging, or testing machine, having in combination, a contact member to make contact with the work, a resilient plate or blade carrying said contact member, a movable carriage member to carry the work, means on said carriage member to hold the work so that the said contact member may make contact therewith, a micrometer device, cooperating anvils for accommodating standard pieces between them, means whereby one of said anvils is operatively connected with the said carriage member, means whereby the other anvil is operatively connected with said micrometer device, and means to indicate in a multiplied manner variation in location of said contact member.

4. A measuring, gauging, or testing machine, having in combination, a contact member to make contact with the work, a support for said contact member permitting movement thereof, a movable carriage member, a micrometer device, co-operating anvils for accommodating standard pieces between them, means whereby one of the said anvils is operatively connected with said carriage member, means whereby the other anvil is operatively connected with said micrometer device, a cross slide on said carriage member to carry the work and movable on said carriage member to and from said contact member, and means to indicate in a multiplied manner variation in location of said contact member.

5. A measuring, gauging, or testing machine, having in combination, a contact member, a support for said contact member permitting movement thereof, a movable carriage member, a micrometer device, cooperating anvils for accommodating the work between them, means whereby one of said anvils is operatively connected with said carriage member, means whereby the other anvil is operatively connected with said micrometer device, a cross slide on said carriage member and movable thereon to and from said contact member, centers on said cross slide adjustable to and from each other, a member carried by said centers and adapted to engage said contact member to enable the position of the said carriage member to control the position of the said contact member when in use, and means to indicate in a multiplied manner variation in location of said contact member.

6. A measuring, gauging, or testing machine having in combination, a contact member, a support for said contact member permitting movement thereof, a movable carriage member, a micrometer device, cooperating anvils for accommodating the work between them, one of said anvils being operatively connected with said carriage member and the other with said micrometer device, a member carried by said carriage member having an annular groove in which said contact member is adapted to engage, and means to indicate in a multiplied manner variation in location of said contact member.

7. A measuring, gauging, or testing machine having in combination, a contact member, a support for said member permitting movement thereof, a movable carriage member, a micrometer device, means whereby the said contact member when it is in use moves in unison with the said carriage member, co-operating anvils, means whereby one of the said anvils is operatively connected with said carriage member, means whereby the other anvil is operatively connected with said micrometer device, means to indicate in a multiplied manner variation in location of said contact member, means tending to move said carriage member in one direction, and an adjustable stop limiting the movement of said carriage member in that direction.

8. In a measuring, gauging, or testing machine, the combination of a movable contact member, levers to indicate the movement thereof in a multiplied manner, a pivot strut member between said levers, tension springs, yokes to which said springs are connected, and members carried by said levers on which the said yokes bear in opposition to the strut member.

9. In a measuring, gauging, or testing machine, the combination of a movable contact member, a system of levers associated therewith to indicate in a multiplied manner variation in position of said contact member, vanes on said levers, receptacles positioned below said levers, liquid in said receptacles in which liquid said vanes are located, the viscosity of said liquid being different in the several said receptacles, the comparative difference in viscosity being substantially inversely proportional to the relative degrees of movement of the respective vanes due to a displacement of the said contact member.

10. In a measuring, gauging, or testing machine, the combination of a contact member, a resilient blade or plate spring on which the contact member is carried and biasing it towards its central position, a lever actuated by the contact member, additional centralizing means to insure proper central position of the said contact member, and manipulable means to take said additional centralizing means out of action and put them in action.

11. In a measuring, gauging, or testing machine, the combination of a contact member, a resilient blade or plate spring on which the said contact member is carried, a lever actuated by the contact member, helical tension springs positioned transversely to and anchored at their outer ends on opposite sides respectively of said lever, a member to which the inner ends of the said springs are connected, interengagement devices on said member and said lever respectively, and means to raise or lower the said member to disengage and engage the said member with the said lever, for the purpose set forth.

12. In a measuring, gauging, or testing machine, a movable contact member, levers connected with said contact member to indicate its movement in a multiplied manner, a pivot member carried by one of said levers and pointed at each end, and bearings in which the points of said pivot member engage to support it and the said lever and allow them to turn on said bearings as a fulcrum or center, said pivot member being formed to be resilient under pressure applied at one bearing towards the other bearing.

13. For use in a measuring, gauging, or testing machine for internal dimensions, comprising a movable contact member to make contact with the work, a movable carriage member for carrying the work and devices for indicating the movement or variation of location of said contact member in a multiplied manner, a calibrating device for said contact member consisting essentially of a support member to be mounted on said carriage member and carrying elements in which models of the section of the internal part to be gauged are presented in external form.

14. For use in a machine for measuring, gauging, or testing, the effective diameter of internal screw threads, comprising a movable contact member for engaging the thread, a movable carriage member for the work and devices for indicating the movement or variation of location of said contact member in a multiplied manner, a calibrating device for said contact member consisting essentially of a support member to be mounted on said carriage member, two pairs of discs, means to secure the discs of each pair together, the discs of each pair of discs being so formed at their edge parts adjacently to their junction as together to present a model of a section of screw thread groove of correct form.

AXEL CHARLES WICKMAN.